Figure 1:
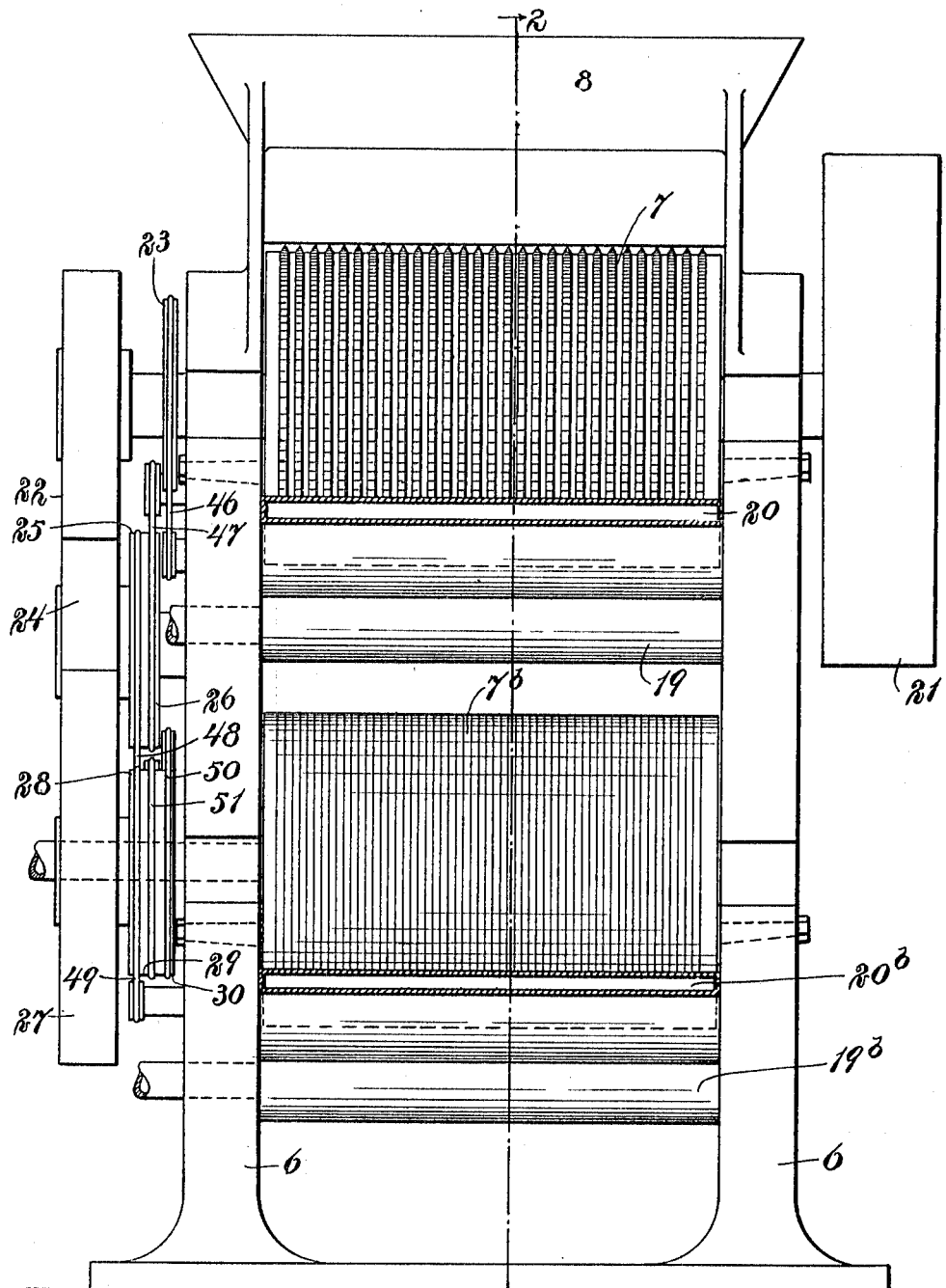

J. W. GRAVES.
APPARATUS FOR GINNING COTTON.
APPLICATION FILED NOV. 22, 1905.

1,118,412.

Patented Nov. 24, 1914.
4 SHEETS—SHEET 1.

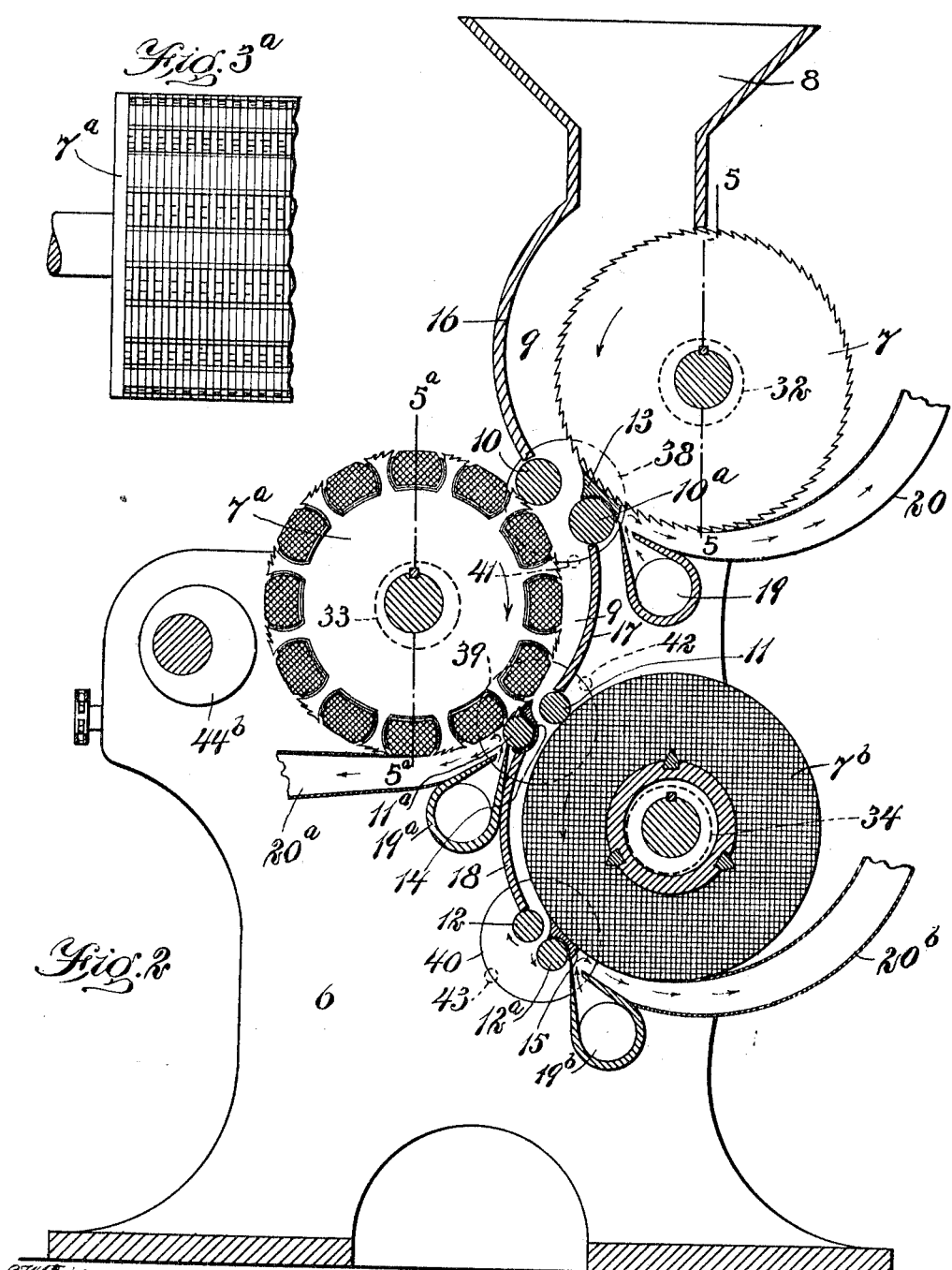

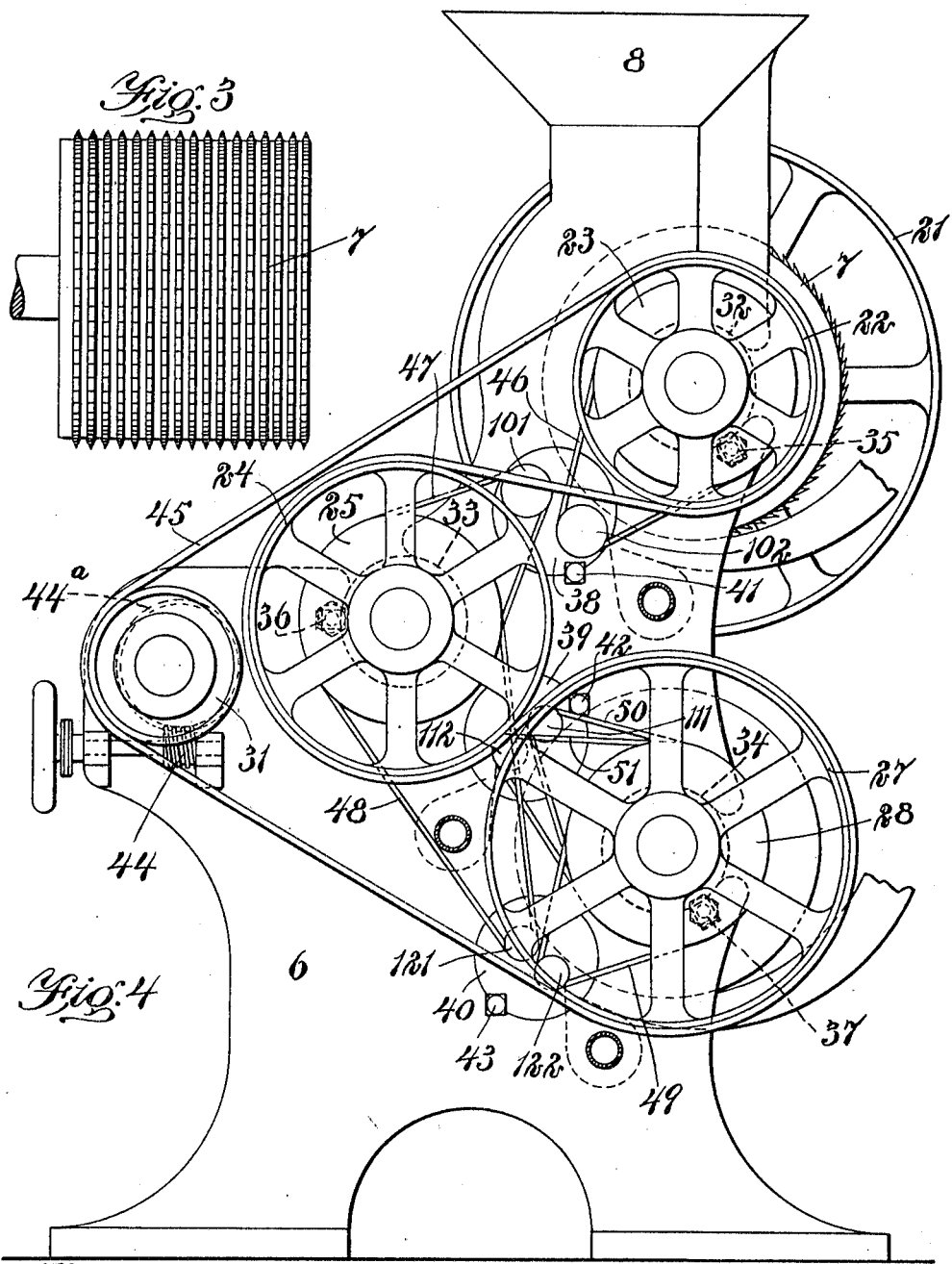

J. W. GRAVES.
APPARATUS FOR GINNING COTTON.
APPLICATION FILED NOV. 22, 1905.
1,118,412.
Patented Nov. 24, 1914.
4 SHEETS—SHEET 4.
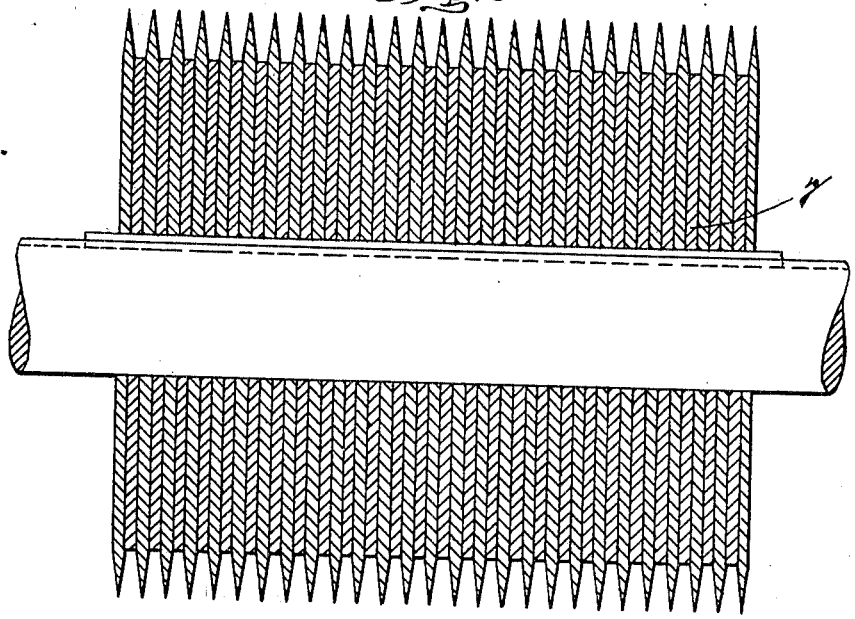
Fig. 5
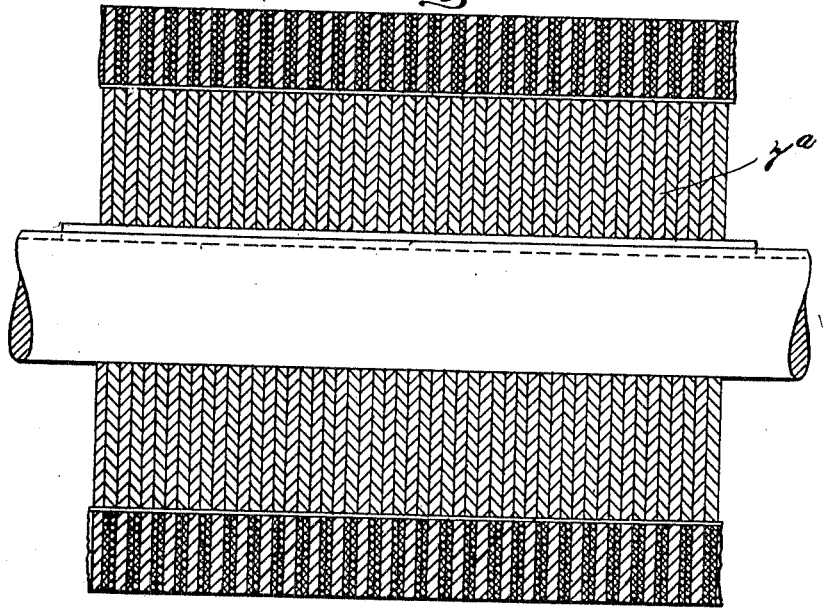
Fig. 5ᵃ
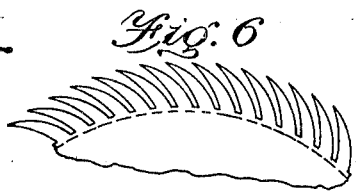
Fig. 6

UNITED STATES PATENT OFFICE.

JOHN W. GRAVES, OF WINTHROP, MASSACHUSETTS, ASSIGNOR, BY DIRECT AND MESNE ASSIGNMENTS, OF ONE-THIRTIETH TO CHARLES S. YOUNG, OF WINTHROP, MASSACHUSETTS, ONE-TENTH TO JANE BRIDGES, OF NEWBURYPORT, MASSACHUSETTS, AND TWENTY-SIX THIRTIETHS TO CHARLES F. BROWN, TRUSTEE, OF READING, MASSACHUSETTS.

APPARATUS FOR GINNING COTTON.

1,118,412.      Specification of Letters Patent.      Patented Nov. 24, 1914.

Application filed November 22, 1905. Serial No. 288,558.

*To all whom it may concern:*

Be it known that I, JOHN W. GRAVES, of Winthrop, in the county of Suffolk and State of Massachusetts, have invented certain new and useful Improvements in Apparatus for Ginning Cotton, of which the following is a specification.

My invention relates to cotton gins and has for its object to provide means by which a more rapid, thorough, and complete separation of lint cotton from cotton seed may be accomplished than has been accomplished heretofore.

Broadly considered, the manner in which my improved cotton gin operates may be described as the continuous progression of a mass, sheet or layer of seed cotton through the field of action of mechanical instrumentalities in such a way as to subject the sides of this sheet of seed cotton alternately to different mechanical actions, each of which draws fibers of different lengths or characters from the seeds. By this mode of ginning cotton, a more thorough ginning will result than from subjecting the seed cotton to the action of only one kind of mechanical action, or a number of actions or treatments by the same mechanical device. This mode of ginning cotton may be carried out in a machine which consists in a novel arrangement of mechanical parts whereby fibers of different lengths will be so engaged as not only to be removed from the seed, but, if so desired, they may also be kept separated from fibers of other lengths and conveyed to different receptacles and put up in different bales or commercial packages.

For a thorough comprehension of the characteristic features of my invention, attention is directed to the accompanying drawings, specification and claims, and in which,—

Figure 1 represents a front elevation of one type of machine invented by me, for carrying out my improved method of ginning cotton, and in which is shown the main frame, the main drive pulley, the several transmitting pulleys and belts, two of the gin cylinders and pneumatic tubes. Fig. 2 represents a vertical cross-section of Fig. 1 on the line *x—x*, showing one side of the main frame, feed-hopper, seed-cotton channel and casing for channel, gin cylinders, conveyer and traction rollers, annular eccentric bearings, pneumatic tubes and lint flues. Figs. 3 and 3$^a$ represent partial elevations of the gin cylinders 7 and 7$^a$. Fig. 4 represents a side elevation of the machine, showing the position and direction of travel of the several pulleys and belts and belt-tightener. Figs. 5 and 5$^a$ represent longitudinal sections of gin cylinders 7 and 7$^a$. Fig. 6 represents a fragmentary view of the toothed disk.

The same reference characters indicate the same parts in all the figures.

Referring to the drawings, 6 indicates a suitable frame upon and within which is mounted mechanism invented by me, suitable for carrying out my improved method of ginning cotton.

7, 7$^a$ and 7$^b$ indicate three differently constructed gin cylinders, 8 a feed-hopper, 10, 10$^a$, 11, 11$^a$, 12 and 12$^a$ conveyer and traction rollers, 13, 14 and 15 shields or stripper bars, and 16, 17 and 18 casings for channel 9.

19, 19$^a$ and 19$^b$ indicate pneumatic tubes, 20, 20$^a$ and 20$^b$ lint flues, and 21 the main drive pulley.

22, 23, 24, 25, 26, 27, 28, 29 and 30 represent transmitting pulleys, 31 an idler and 32, 33 and 34 annular eccentric bearings.

35 36 and 37 represent pins that secure the bearings 32, 33 and 34 in desired position.

38 39 and 40 represent socket bearings for the conveyer and traction rollers and shields.

41, 42 and 43 represent pins for securing bearings 38, 39 and 40 in desired position.

44 represents a belt-tightening device consisting of a screw meshing with a wheel 44$^a$ on the eccentric bearing 44$^b$ of pulley 31.

45, 46, 47, 48, 49, 50 and 51 represent transmitting belts passing over pulleys 101, 102, 111, 112, 121 and 122 connected to the respective rolls 10, 10$^a$, 11, 11$^a$, 12, and 12$^a$.

With such an apparatus as shown in the accompanying drawings, for carrying out my improved method of ginning cotton, particular reference being had to Fig. 2, I state that by any suitable means the seed cotton is deposited in the feed hopper 8 and is allowed to fall into contact with the rotary gin cylinder 7, the periphery of which is provided with cone-shaped, pointed teeth which engage the mass of cotton and carry it downward until obstructed and retarded by the rollers 10 and 10ª and the stripper shield 13. The conveyer rollers 10 and 10ª have a peripheral travel of only 75% of the cylinder 7 to cause the mass of cotton to become packed in the channel 9 and press with the necessary force against the cylinder. The greater velocity of the gin cylinder results in extracting from the seed that portion of lint engaged by the cone-shaped teeth of the said cylinder and containing the longest and most tightly packed fibers. The conveyer rollers 10 and 10ª act to force the sheet of seed cotton downwardly in the channel 9 and bring the other side thereof into contact with the gin cylinder 7ª, the periphery of which is composed of alternate longitudinal sections of cone teeth and friction surfaces. The cone teeth act to force the sheet downwardly until obstructed by the shield 14 and conveyer roller 11, to which I give a peripheral travel of only 75% of the cylinder 7ª. The dentate sections of cylinder 7ª perform the two-fold function of extracting a considerable portion of the lint directly from the seed, and of engaging and drawing other fibers past the shield 14 into such position as to be engaged by the traction roller 11ª in contact with the friction surface of cylinder 7ª and nipped between the roll and cylinder, whereby the fibers thus engaged are also drawn off from the seed.

By the rotary action of cylinder 7ª and conveyer roller 11, the unginned portion of seed cotton is forced downwardly in the channel 9 and acted upon by the gin cylinder 7ᵇ, the periphery of which is composed entirely of friction material which acts to engage the fibers, and, by impinging the seeds against the stripper shield 15, to pull off the last of the fibers and so complete the ginning process.

The conveyer rollers 12 and 12ª have a peripheral travel of 75% of gin cylinder 7ᵇ for the same purpose as that above described. Gin cylinder 7ª is given a velocity of only 75% of cylinder 7, and gin cylinder 7ᵇ a velocity of only 75% of that of cylinder 7ª. This is to enable the mass of cotton to become packed against each cylinder and to compensate for the mass removed by the preceding cylinder.

By the action of a presser blower, a current of air is forced through the pneumatic tube 19 and expels the fibers through flue 20 extracted by cylinder 7. A like process is performed by pneumatic tubes 19ª and 19ᵇ through flues 20ª and 20ᵇ, and thus the fibers of different lengths extracted by the several cylinders may be discharged into separate receptacles and separately packed.

It will be observed that the drawings show the rotary parts mounted in eccentric bearings. The purpose of this is to permit gin cylinders to be quickly and easily adjusted toward the shields and rolls to compensate for wear and keep them in the desired relation with the other parts.

By the employment of differently constructed cylinders and auxiliary parts, I am thereby enabled to engage fibers of different lengths. By the employment of different outlet flues, I am able to keep the different lengths of fiber separated. By alternating the action of the ginning devices from side to side of the sheet of seed cotton, I am able to get more rapid results. By combing or pulling the fiber from the seed by pointed, cone-shaped, rather than saw-like teeth, I am able to get the fiber of full length, uninjured, uncut and unbroken. By the employment of the several different devices, I am able to extract all the fiber from the seed, for the last cylinder, which acts wholly by friction, is able to catch the last fibers remaining in the seeds which are too thin and too well combed out to be caught by the teeth, as well as too short to be nipped between the roll 11ª and cylinder 7ª, and to draw such fibers past the shield 15; leaving the seeds, now practically bare, to fall out between the rolls 12 and 12ª.

By the combination of the several features of advantage in my improved method and means of ginning cotton, I am able to get a greater quantity and better quality of fiber than has been obtained by previous methods and means. By ginning cotton more rapidly, getting a larger and better yield of fiber, and at less cost of operation than by other methods and means, my method also becomes more economical than old methods and means.

While I show but three differently constructed gin cylinders and auxiliary parts, I do not wish to be understood as confining my invention to only that number and arrangement of parts, or to the particular type of machine shown, as many and wide variations may be made without departing from the spirit of the invention.

Broadly considered, my method consists in continuously progressing a sheet of seed cotton through an apparatus suitably arranged to act upon alternate opposite sides and provided with such parts as will engage fibers of different lengths, separate them from the seed, and convey the different lengths to desired receptacles.

I claim:—

1. An apparatus for ginning seed cotton which comprises means for combing a mass of the cotton to remove the long or matted fibers, means for grasping the fibers of less length and pulling them from the seeds, and means for holding the seeds and rubbing them to remove the shortest fibers.

2. A cotton gin, comprising a combing member, and a combing and rubbing member, arranged to act successively on seed cotton fed into the gin, and means for holding the cotton up to said members, whereby the latter are enabled first to pull out long and matted fibers, and then to grasp and pull remaining unmatted fibers from the seeds.

3. A cotton gin comprising combing means, nipping means, frictional means, and guides for leading the material thereto and causing said means to act successively on seed-cotton fed to the gin and draw therefrom fibers of diminishing lengths.

4. A cotton gin comprising a combing device arranged to act on seed-cotton fed to the gin, a device having a surface alternately toothed and toothless located to act on the cotton subsequently to the action of the combing device, a gripper coöperating with the toothless portions of said device to grip fibers left by the toothed portions thereof, and draw such fibers from the seeds, and means having a relatively-smooth, frictional surface for removing the fibers left adhering to the seeds by the previous devices.

5. A cotton gin comprising a toothed cylinder, a cylinder having its surface alternately toothed and toothless, a toothless friction cylinder, provisions for bringing seed-cotton into engagement successively with said cylinders, and a roll coöperating with the toothless portions of the second cylinder for gripping and drawing off fibers.

6. A cotton gin having a passage of gradually diminishing cross-sectional area arranged to permit descent of a gradually-diminishing mass of seed-cotton, ginning means which are respectively toothed, partly toothed and partly smooth, and entirely smooth, on opposite sides of said passage and at different levels arranged to act successively on alternate sides of the cotton, and constructed for removing therefrom fibers of successively-diminishing lengths.

7. A cotton gin having a passage shaped with diminishing cross-sectional areas from its inlet to its outlet, and arranged to permit progress therethrough of a gradually-diminishing mass of seed-cotton, ginning means on opposite sides of said passage and at different distances from its inlet arranged to act successively on alternate sides of the cotton, and constructed for removing therefrom fibers of successively-diminishing lengths, and devices constructed and arranged for feeding the cotton from the several ginning means and simultaneously retarding and crowding the mass against the ginning means.

8. A cotton gin, comprising a plurality of instrumentalities constructed for combing, and pulling fibers, by frictional action, respectively, and provisions for bringing said instrumentalities into action successively on seed-cotton fed into the gin.

In testimony whereof I have affixed my signature, in presence of two witnesses.

JOHN W. GRAVES.

Witnesses:
C. F. BROWN,
A. C. RATIGAN.

Copies of this patent may be obtained for five cents each, by addressing the "Commissioner of Patents, Washington, D. C."